United States Patent [19]
Graham

[11] 3,933,678
[45] Jan. 20, 1976

[54] OPTICALLY CLEAR ORGANOSILICON COMPOUNDS

[75] Inventor: Craig E. Graham, Saginaw, Mich.

[73] Assignee: Dow Corning Corporation, Midland, Mich.

[22] Filed: July 29, 1974

[21] Appl. No.: 492,577

Related U.S. Application Data

[63] Continuation-in-part of Ser. No. 402,221, Oct. 1, 1973, abandoned.

[52] U.S. Cl................. 252/300; 350/96 C; 350/179
[51] Int. Cl.² ............................................. F21V 9/00
[58] Field of Search.......... 252/300, 321; 350/96 C, 350/179; 106/287 SB

[56] References Cited
UNITED STATES PATENTS

| | | | |
|---|---|---|---|
| 3,036,985 | 5/1962 | Daudt | 351/160 |
| 3,299,267 | 1/1967 | Christianson et al. | 250/367 |
| 3,356,616 | 12/1967 | Sandler et al. | 250/483 |
| 3,650,979 | 3/1972 | Steinbach et al. | 252/321 |
| 3,655,274 | 4/1972 | Craig | 350/286 |
| 3,784,479 | 1/1974 | Keil | 252/321 |
| 3,856,701 | 12/1974 | Householder | 252/321 |

*Primary Examiner*—Benjamin R. Padgett
*Assistant Examiner*—Deborah L. Kyle
*Attorney, Agent, or Firm*—Jack E. Moermond

[57] ABSTRACT

Organosilicon grease-like compounds having good shear stability and being suitable for optical coupling are prepared by mixing a phenylmethylpolysiloxane fluid or a trimethylsiloxy endblocked fluid consisting of decylmethylsiloxane, tetradecylmethylsiloxane and alpha-methylstyrenemethylsiloxane units, a finely divided silica, and a polyalkylene oxide. A typical compound would be a mixture of 150 parts of a phenylmethylpolysiloxane, 15.5 parts of a fume silica having surface area of 380 square meters per gram, and 4 parts of polypropylene oxide having a molecular weight of 2,000. Such a compound has a light transmission in excess of 80% and excellent work shear stability.

8 Claims, No Drawings

OPTICALLY CLEAR ORGANOSILICON COMPOUNDS

This application in a continuation-in-part of U.S. application Ser. No. 402,221 filed Oct. 1, 1973 now abandoned.

Optical coupling compounds are used to enhance the transmission of electromagnetic radiation between two solid surfaces. The purpose of the compound is to cut down on reflection of the electromagnetic radiation at each surface thereby increasing the transmission of the radiation through an apparatus. It is known that combinations of a treated finely divided silica and a phenylmethylsiloxane fluid can be used for optical coupling compounds and that phenylsiloxane fluids can be used per se for this purpose. For example, the use of phenylmethylsiloxane fluids is shown in U.S. Pat. No. 3,655,274 and the use of an organosilicon grease or resin is shown in U.S. Pat. Nos. 3,356,616 and 3,299,267.

The fluids can be successfully used when the unit is sealed, but in those cases where the unit connot be sealed a grease or cured resin is needed. Cured resins, however, prevent taking apart and reassembling the optical system in the field. Thus, in many applications a grease is essential. With a grease, the lens system can be taken apart, repaired or cleaned and new grease applied and the system reassembled.

The primary grease heretofore employed has been sold under the designation QC-2-0057. It is a mixture of 94.5% by weight of a fluid copolymer of dimethylsiloxane containing about 10 mole percent phenylmethylsiloxane and 5.5% by weight of a treated silica of the type shown in U.S. Pat. No. 3,036,985. However, this compound has two disadvantages. First, the treated silica employed therein is quite expensive and difficult to manufacture. Second, the work shear properties of the compound leave much to be desired. The latter is important because the cheapest way to assemble a device consisting of, for example, a scintallant and a photo multiplier tube used in devices to detect gamma radiation, is to place the grease on the face of one of the glass or plastic optical plates and then squeeze that plate against a second one to give a uniform bubble-free layer of compound between the two plates. In the operation, the grease is forced to flow several inches and to be reduced in thickness from 2 inches to from 0.4 to 1 mm. The excess is removed from the edges of the plate. If, however, during the operation the grease loses its consistency due to shear, it will subsequently flow from between the plates thereby impairing the optical coupling.

Attempts to use a cheaper filler such as a fume silica results in a grease which has ever less shear stability than those prepared with the aforesaid treated fillers.

Thus, the problem posed at the time of this invention was how to prepare a coupling compound using a cheaper filler than that of U.S. Pat. No. 3,036,985 and which also has better shear ability than QC-2-0057, without ruining the optical properties. The latter requires a light transmission of at least 80% and preferably 85%* or more at 550 millimicrons wave length when measured in 1 cm. cell as compared with the same thickness of water. Applicant has found that these objectives can be reached by using the polyalkylene oxides shown below.

*Light transmission as recorded in the specification and claims is the percent transmission through a 1 cm. thick cell as compared with the same thickness of water for radiation having 550 millimicron wave length. The percent transmission increases as the thickness of the sample decreases.

This invention relates to a composition having a light transmission of at least 80% at 550 millimicrons wave length, consisting essentially of (1) a phenylmethylpolysiloxane fluid having a refractive index at 25°C. of from 1.42 to 1.47 in which the substituents attached to the silicon are essentially all phenyl and methyl radicals, (2) a silica thickener having a surface area of at least 100 square meters per gram as measured by the BET Method in amount of from 5 to 25 parts by weight based on 100 parts of (1) and (3) a polyester soluble in (1) and being selected from the group consisting of polyethylene oxide, polypropylene oxide, copolymers of propylene oxide and ethylene oxide, copolymers of ethylene oxide and siloxanes, copolymers of propylene oxide and siloxanes, and copolymers of propylene oxide, ethylene oxide and siloxanes, the substituents on the silicon atoms in the siloxane portion of the copolymers being of the group consisting of lower aliphatic hydrocarbon radicals and phenyl radicals, there being at least 25 % by weight of said alkylene oxides in the copolymers, (3) being present in amount from 1 to 30 parts by weight based on 100 parts of (1).

This invention also relates to a composition having a light transmission of at least 80% at 550 l millimicrons wave length, consisting essentially of (A) a trimethylsiloxy endblocked fluid having a refractive index at 25°C. of from 1.42 to 1.47 consisting essentially of about 35 to 45 mole percent decylmethylsiloxane units, about 35 to 45 mole percent tetradecylmethylsiloxane units and anout 15 to 25 mole percent of alphamethylstyrememethylsiloxane units, (B) a silica thickener having a surface area of at least 100 square meters per gram as measured by the BET Method in an amount of from 5 to 25 parts by weight based on 100 parts by weight of (A), and (C) a polyether soluble in (A) and being of the group consisting of polyethylene oxide, polypropylene oxide, copolymers of polyethylene oxide and polypropylene oxide, copolymers of ethylene oxide and siloxanes, copolymers of propylene oxide and siloxanes, and copolymers of ethylene oxide, propylene oxide and siloxanes, the substituents on the silicon in the siloxane portion of the copolymers being of the group consisting of lower aliphatic hydrocarbon and phenyl radicals, there being at least 25% by weight of said alkylene oxides in the copolymers, the proportion of (C) being from 1 to 30 parts by weight based on 100 parts by weight of (A).

The organopolysiloxane (1) can be any phenylmethylpolysiloxane within the desired refractive index range and can consist of siloxane units of the type phenylmethylsiloxane units, diphenylsiloxane units, monophenylsiloxane units, diphenylmethylsiloxane units, dimethylphenylsiloxane units, dimethylsiloxane units, trimethylsiloxane units, monoethylsiloxane units and $SiO_2$ units. These units can be combined in any combination which will give a fluid material having the desired refractive index. This means that the fluids can be linear, branched or cyclic in structure and they can be prepared by any of the conventional means for preparing phenylmethylsiloxane fluids.

The fluid (A) is a trimethylsiloxy endblocked fluid consisting essentially of about 35 to 45 mole percent $(C_{10}H_{21})(CH_3)SiO$ units, about 35 to 45 mole percent of $(C_{14}H_{29})(CH_3)SiO$ units, and about 15 to 25 mole percent of

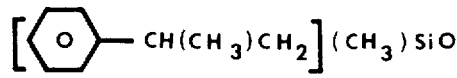

units. Any such fluids having a refractive index within the range of 1.42 to 1.47 at 25°C. can be used herein. The preferred fluid consists of about 40 mole percent of the decylmethylsiloxane units, about 40 mole percent of the tetradecylmethylsiloxane units, and about 20 mole percent of alpha-methylstyrememethylsiloxane units and has a refractive index of about 1.46. Siloxanes of this kind and their preparation are well known as shown by U.S. Pat. No. 3,624,190 the dislosure of which is incorporated by reference.

Ingredients (2) and (B) in the above compositions are any finely divided silica having a surface area of at least 100 square meters per gram as measured by the BET Method. These silicas can be prepared by any of the conventional processes known in the art such as by the well known aerogel technique, pyrogenic techniques, or by wet methods such as the precipitation of finely divided silica from a silica sol made from sodium or potassium silicate. The silicas can be untreated; that is, they can have no material on the surface thereof or they can be treated with alcohols or organosilicon compounds and these treated silicas can be prepared by any of the conventional methods such as, for example, by taking a preformed finely divided dry silica and reacting it with chlorosilanes, alkoxysilane or siloxanes or by reacting a silica organogel with organosilicon compounds as described and/or claimed in U.S. Pat. Nos. 3,036,985 and 3,015,645.

The ingredients (3) and (C) for the compounds of this invention are polyalkylene oxides or copolymers of polyalkylene oxides with organosiloxanes. These polyalkylene oxides are sometimes referred to by those skilled in the art as polyethers, glycols, or polyglycols. The only critical feature of these materials is that they be soluble in (1) or (A). More specifically, the composition of this ingredient can be polyethylene oxide (or glycol), polypropylene oxide, copolymers of ethylene oxide and propylene oxide, copolymers of ethylene oxide and organosiloxanes, copolymers of propylene oxide and organopolysiloxanes, and copolymers of ethylene oxide, propylene oxide and organopolysiloxanes. The tern "soluble in (1)" or "soluble in (A)" means that this ingredient must dissolve in (1) or (A), respectively, and give a clear solution therein under operating conditions. The molecular weight of this ingredient is not critical so long as it is soluble in (1) or (A). The structure of this ingredient is not critical; that is, it can be linear, cyclic, or branched in structure. The polyalkylene oxide can have OH ends or it can be blocked with hydrocarbon or other groups derived, for example, from alcohols, carboxylic acids or isocyanates. Ingredients (3) and (C) should be present in amount from 1 to 30 parts by weight based on 100 parts by weight of (1) or (A), respectively.

Polyethylene oxides and polypropylene oxides and copolymers thereof are well known articles of commerce and nothing further need be said as to their methods of preparation or availability.

The copolymers of alkylene oxides and organopolysiloxanes are also well known materials and are articles of commerce. For the purpose of this invention, these copolymers can be of two types. First, those in which the alkylene oxide portion and the siloxane portion are connected through silicon-carbon linkages, such as those copolymers described in U.S. Pat. No. Re. 25,727 and U.S. Pat. No. 3,402,192 where the linking group between the Si and the alkylene oxide is an alkylene radical. The second type of copolymer are those in which the alkylene oxide portion and the organopolysiloxane portion are connected through silicon-oxygen-carbon bonds such as those copolymers described in U.S. Pat. No. 3,600,418. All three of these patents are incorporated herein by reference.

For the purpse of this invention, it is preferred that the substituents on the silicon atoms in the organopolysiloxane portion be lower aliphatic hydrocarbon radicals such as methyl, ethyl, propyl, butyl, vinly or allyl, or phenyl radicals. As can be seen from the aforesaid patents, the copolymers operative herein can be linear, branched or cyclic in structure and they can have any proportion of siloxane to alkylene oxide so long as they are soluble in (1) or (A) and contain at least 25% by weight alkylene oxide.

The compounds of this invention can be prepared by mixing the ingredients in any desired order and in any convenient fashion; that is, they can be mixed, for example, by hand, or on a three roll mill, a versator, or a colloid mill.

In addition to the required ingredients, the compositions of this invention can contain other non-essential materials such as corrosion inhibitors, oxidation retarders and flame retarders. These additional ingredients must not impair the optical properties of the compound beyond permissible limits.

The following examples are illustrative only and should not be construed as limiting the invention which is properly delineated in the appended claims. The penetration and work shear stability of the compounds shown in the examples were determined by ASTM-D-1403-69 using a ¼ scale penetrometer and the readings were converted to those of a full scale penetrometer using the equation $P = 3.75_p + 24$, where p is the ¼ scale reading. In these examples the penetration is recorded in tenths of a mm.

EXAMPLE 1

This example illustrates the effect of the glycol in stabilizing a compound containing a treated filler.

A compound was prepared by milling 94.5% by weight of a trimethylsiloxy endblocked copolymer of 10 mole percent phenylmethylsiloxane and 90 mole percent dimethylsiloxane, said copolymer having a viscosity of 1000 cs. and 5.5% by weight of a treated silica filler prepared in accordance with Example 3 of U.S. Pat. No. 3,036,985. This patent is hereby incorporated herein by reference. To 30 parts of this mixture was added by hand mixing 0.8 part of polypropylene oxide having a molecular weight of 2,000. The resulting mixture was a clear material having excellent light transmission. The unworked penetration of this material was 248. After working in accordance with the aforesaid ASTM test, the penetration was 264.

By contrast, the unworked penetration of the compound without the polypropylene glycol was 325 whereas the worked penetration was greater than 400 indicating extensive breakdown of the grease under shear.

EXAMPLE 2

Two formulations were prepared by mixing the ingredients shown below in the proportions shown. The siloxane and the polypropylene oxide were first mixed and the silica was then added. The mixture was given three passes on a three roll mill. After mixing, the compound was allowed to stand for the day indicated in the table below and then the worked and unworked penetration was determined and the results are shown. The light transmission of both compounds was excellent and specifically that of compound 1 was found to be 85% as measured by the aforesaid test. The compositions were as follows:
1. 150 parts by weight of the siloxane $C_6H_5Si\{OSi(CH_3)_3\}_3$*,
   15.5 parts of a pyrogenic silica having a surface area between 380 and 420 square meters per gram as measured by the BET Method, and
   4 parts by weight of polypropylene oxide having a molecular weight of 2,000.
2. 150 parts by weight of $C_6H_5Si\{OSi(CH_3)_3\}_3$,
   15.5 parts by weight of the silica of formulation (1) and
   2 parts by weight of polypropylene oxide of 2,000 molecular weight.

*Refractive index 1.4600 at 25°C.

The shear stability of each sample was tested and the penetration measurements are shown below:

| Formulation | Days Aging | Unworked Penetration | Worked Penetration |
|---|---|---|---|
| 1 | 14 | 240 | 249 |
|   | 30 | 231 | 251 |
|   | 75 | 236 | 255 |
| 2 | 3 | 230 | 242 |
|   | 30 | 253 | 285 |

By contrast, in each of these formulations without the propylene oxide the worked penetration was in excess of 400 showing inoperative greases for the purpose of this invention.

EXAMPLE 3

A copolymer of 69.22 mole percent dimethylsiloxane, 24.84 mole percent phenylmethylsiloxane, and 5.92 mole percent trimethylsiloxane was prepared having a viscosity of 96.1 centistoke and a refractive index of 1.4542 at 25°C. When this siloxane is substituted for that of Example 2, compounds of equivalent stability and light transmission are obtained.

EXAMPLE 4

150 parts by weight of the fluid $C_6H_5Si\{OSi(CH_3)_3\}_3$ was mixed as in Example 2 with 15.5 parts by weight of a pyrogenic silica having a surface area of about 400 square meters per gram and 4.0 parts by weight of polypropylene glycol of 1200 molecular weight. The resulting mixture had excellent light transmission and after 2.5 months at room temperature the unworked penetration was 219 and the worked penetration of 242. Each value was an average of three measurements.

EXAMPLE 5

This example shows the effectiveness of silicone-alkylene oxide copolymers.
Formulation 1 was a mixture of:
  120 parts $C_6H_5Si\{OSi(CH_3)_3\}_3$,
  10 parts of the silica of Example 4, and
  10 parts $(CH_3)_3Si$

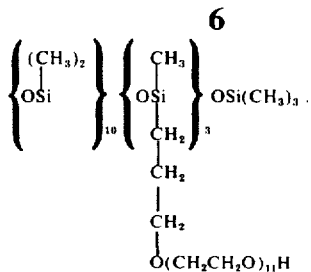

Formulation 2 was a mixture of:
  150 parts $C_6H_5Si\{OSi(CH_3)_3\}_3$,
  15.5 parts of the silica of Example 4, and
  4 parts $(CH_3)_3Si$

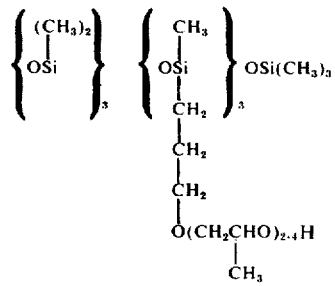

After 2.5 months standing at room temperature, the shear resistance of each sample was tested and the penetration was as follows:

| Formulation | Unworked | Worked |
|---|---|---|
| 1 | 341 | 391 |
| 2 | 228 | 297 |

Both of these formulations has excellent light transmission.

EXAMPLE 6

Equivalent results are obtained when the following siloxane fluids are substituted in formulation 1 of Example 2.

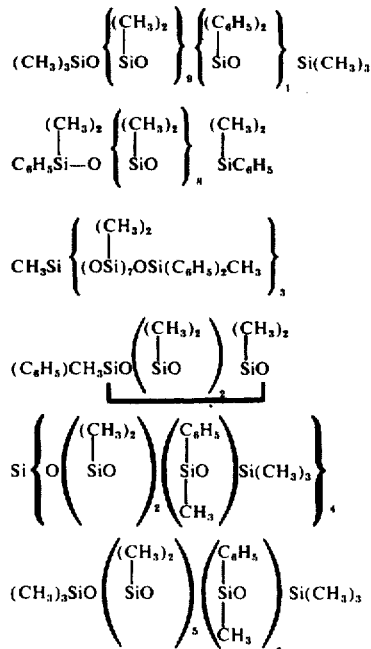

EXAMPLE 7

Equivalent results are obtained when the following polyalkylene oxides and copolymers are substituted for the polypropylene oxide of formulation 1 of Example 2.
Polyethylene oxide molecular weight 400.
Copolymer of 50 mole percent ethylene oxide and 50 mole percent propylene oxide, said copolymer having a molecular weight of 8000.

given one pass at a roll pressure of about 225 psi. The amount of silica employed and the properties of the compositions which were measured are set forth in the table below.

| Composition | Amt. Silica | Refractive Index | Light Transmission % | Penetration Unworked | Penetration Worked |
|---|---|---|---|---|---|
| I | 8 | — | — | 241 | 254 |
| II | 9 | 1.4645 | 91 | 226 | 236 |
| III | 10 | 1.4646 | 90 | 220 | 228 |
| IV | 10* | — | — | 220 | 227 |
| V | 11 | 1.4649 | — | 201 | 213 |

*This silica was Cab-O-Sil MS-75 whereas in the other four compositions Cab-O-Sil S-17 was used. MS-75 has a surface area of 255±15 m²/gm (BET) while S-17 has a surface area of 400±20 m²/gm (BET).

EXAMPLE 9

Five compositions were prepared following the procedure of Example 8. These compositions consisted essentially of (A) 100 parts of the fluid of Example 8,

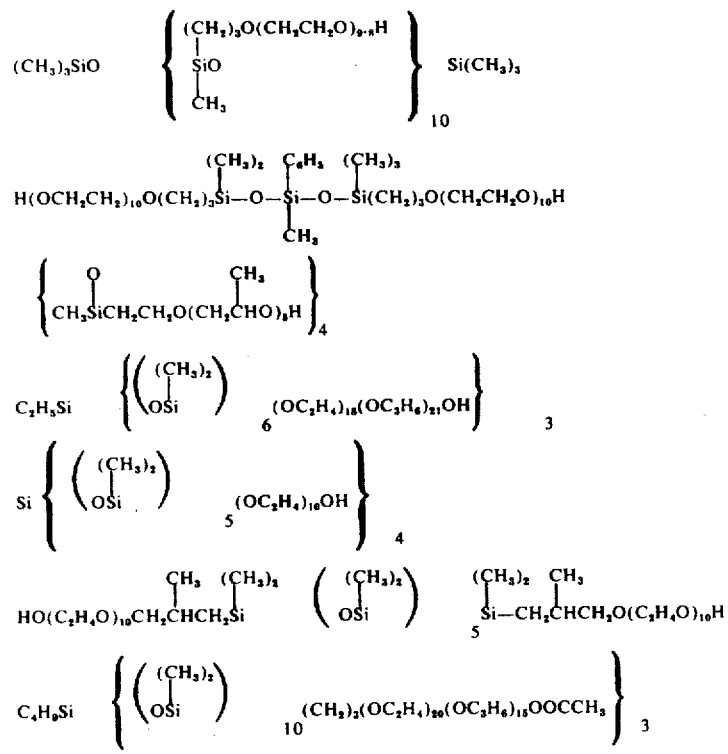

EXAMPLE 8

Five compositions were prepared which consisted essentially of (A) 100 parts of trimethylsiloxy endblocked fluid having a refractive index of about 1.4640 and a viscosity of about 1200 cs. at 25°C. and consisting essentially of about 40 mole percent decylmethylsiloxane units, about 40 mole percent tetradecylmethylsiloxane units and about 20 mole percent alphamethylstyrenemethylsiloxane units, (B) varying amounts of a pyrogenic silica, and (C) 2.3 parts of a polypropylene oxide having a molecular weight of about 2000 (Dow P-2000 Polyglycol). These compositions were prepared by first adding (C) to about two-thirds of (A) in a pony mixer tub, then adding (B) and stirring to uniformity, next adding the remaining one-third of (A) and mixing thoroughly, and finally transferring the composition to a 3-roll mill where it was (B) 10 parts of pyrogenic silica (Cab-O-Sil S-17), and (C) varying amounts of polypropylene oxide (Dow P-2000 Polyglycol). As shown by the test results set forth in the table below, the amount of the polypropylene oxide seems to have little effect on the mechanical shear stability of the composition.

| Composition | Amount Polypropylene Oxide | Penetration Unworked | Penetration Worked |
|---|---|---|---|
| I | 2.1 | 213 | 224 |
| II | 2.2 | 212 | 224 |
| III | 2.3 | 214 | — |
| IV | 2.4 | 212 | — |
| V | 2.5 | 215 | 223 |

That which is claimed is:

1. A composition having a light transmission of at least 80% at 550 milli micron wave length, consisting essentially of
   1. a phenylmethylsiloxane fluid have a refractive index at 25°C. of from 1.42 to 1.47 said phenyl and methyl groups being essentially all of the substituents on the silicon atoms of said siloxane,
   2. a silica thickener having a surface area of at least 100 square meters per gram as measured by the BET Method in amount of from 5 to 25 parts by weight based on 100 parts by weight of (1), and
   3. a polyether soluble in (1) and being of the group consisting of polyethylene oxide, polypropylene oxide, copolymers of polyethylene oxide and polypropylene oxide, copolymers of ethylene oxide and siloxanes, copolymers of propylene oxide and siloxanes and copolymers of ethylene oxide, propylene oxide and siloxanes, the substituents on the silicon in the siloxane portion of the copolymers being of the group consisting of lower aliphatic hydrocarbon and phenyl radicals, there being at least 25% by weight of said alkylene oxides in the copolymers, the proportion of (3) being from 1 to 30 parts by weight based on 100 parts by weight of (1).

2. A composition of claim 1 in which (1) is $C_6H_5Si\{OSi(CH_3)_3\}_3$, (2) is a pyrogenic silica and (3) is polypropylene oxide.

3. A composition in accordance with claim 1 in which (1) is $C_6H_5Si\{OSi(CH_3)_3\}_3$, (2) is a pyrogenic silica and (3) is a copolymer of propylene oxide and dimethylpolysiloxane.

4. A composition in accordance with claim 1 in which (1) is $C_6H_5Si\{OSI(CH_3)_3\}_3$, (2) is pyrogenic silica and (3) is a copolymer of ethylene oxide and dimethylpolysiloxane.

5. A composition having a light transmission of at least 80% at 550 millimicrons wave length, consisting essentially of
   A. a trimethylsiloxy endblocked fluid having a refractive index at 25°C. of from 1.42 to 1.47 consisting essentially of about 35 to 45 mole percent decylmethylsiloxane units, about 35 to 45 mole percent tetradecylmethylsiloxane units and about 15 to 25 mole percent of alpha-methylstyrenemethylsiloxane units,
   B. a silica thickener having a surface area of at least 100 square meters per gram as measured by the BET Method in an amount of from 5 to 25 parts by weight based on 100 parts by weight of (A), and
   C. a polyether soluble in (A) and being of the group consisting of polyethylene oxide, polypropylene oxide, copolymers of polyethylene oxide and polypropylene oxide, copolymers of ethylene oxide and siloxanes, copolymers of propylene oxide and siloxanes, and copolymers of ethylene oxide, propylene oxide and siloxanes, the substituents on the silicon in the siloxane portion of the copolymers being of the group consisting of lower aliphatic hydrocarbon and phenyl radicals, there being at least 25% by weight of said alkylene oxides in the copolymers the proportion of (C) being from 1 to 30 parts by weight based on 100 parts by weight of (A).

6. A composition as defined in claim 5 wherein (A) consists of about 40 mole percent decylmethylsiloxane units, about 40 mole percent tetradecylmethylsiloxane units, and about 20 mole percent alpha-methylstyrenemethylsiloxane units, (B) is a pyrogenic silica and (C) is a polypropylene oxide.

7. A composition as defined in claim 5 wherein (A) consists of about 40 mole percent decylmethylsiloxane units, about 40 mole percent tetradecylmethylsiloxane units, and about 20 mole percent alpha-methylstyrenemethylsiloxane units, (B) is a pyrogenic silica and (C) is a copolymer of propylene oxide and dimethylpolysiloxane.

8. A composition as defined in claim 5 wherein (A) consists of about 40 mole percent decylmethylsiloxane units, about 40 mole percent tetradecylmethylsiloxane units, and about 20 mole percent alpha-methylstyrenemethylsiloxane units, (B) is a pyrogenic silica and (C) is a copolymer of ethylene oxide and dimethylpolysiloxane.

\* \* \* \* \*

UNITED STATES PATENT AND TRADEMARK OFFICE
CERTIFICATE OF CORRECTION

PATENT NO. : 3,933,678
DATED : January 20, 1976
INVENTOR(S) : GRAIG E. GRAHAM

It is certified that error appears in the above—identified patent and that said Letters Patent are hereby corrected as shown below:

Column 9, line 35, the formula "$C_6H_5Si\{OSI(CH_3)_3\}_3$" should read --$C_6H_5Si\{OSi(CH_3)_3\}_3$--.

Signed and Sealed this

Twenty-first Day of December 1976

[SEAL]

Attest:

RUTH C. MASON
*Attesting Officer*

C. MARSHALL DANN
*Commissioner of Patents and Trademarks*